United States Patent
Dykstra et al.

(10) Patent No.: US 11,080,124 B2
(45) Date of Patent: Aug. 3, 2021

(54) SYSTEM AND METHOD FOR TARGETED EFFICIENT LOGGING OF MEMORY FAILURES

(71) Applicant: DELL PRODUCTS, LP, Round Rock, TX (US)

(72) Inventors: Mark Dykstra, Round Rock, TX (US); Amit Shah, Austin, TX (US); Yuwei Cai, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 96 days.

(21) Appl. No.: 16/671,851

(22) Filed: Nov. 1, 2019

(65) Prior Publication Data
US 2021/0133019 A1 May 6, 2021

(51) Int. Cl.
*G06F 11/00* (2006.01)
*G06F 11/07* (2006.01)
*G06F 9/52* (2006.01)

(52) U.S. Cl.
CPC ............ *G06F 11/0778* (2013.01); *G06F 9/52* (2013.01); *G06F 11/0727* (2013.01); *G06F 11/0751* (2013.01)

(58) Field of Classification Search
CPC ............. G06F 11/0778; G06F 11/0727; G06F 11/0751
See application file for complete search history.

(56) References Cited

U.S. PATENT DOCUMENTS

2014/0298109 A1* 10/2014 Nishiyama .......... G06F 11/1044
714/42
2019/0227885 A1* 7/2019 Mutnury ............... G06F 3/0614

* cited by examiner

*Primary Examiner* — Katherine Lin
(74) *Attorney, Agent, or Firm* — Larson Newman, LLP

(57) ABSTRACT

An information handling system includes a memory controller with an error logger, and a DIMM coupled to the memory controller via a memory channel. The DIMM includes a non-volatile memory device mapped to include event blocks that store error information associated with memory events occurring the memory controller, the DIMM, and the memory channel. Each event block includes a flag field and a data field. The error logger receives an indication that a memory event has occurred, reads first flag information from a flag field of an event block, determines whether the event block is locked based upon the first flag information, and if the event block is not locked, then writes second flag information to the flag field and writes event information to a data field of the event block. The event information describes the memory event.

20 Claims, 3 Drawing Sheets

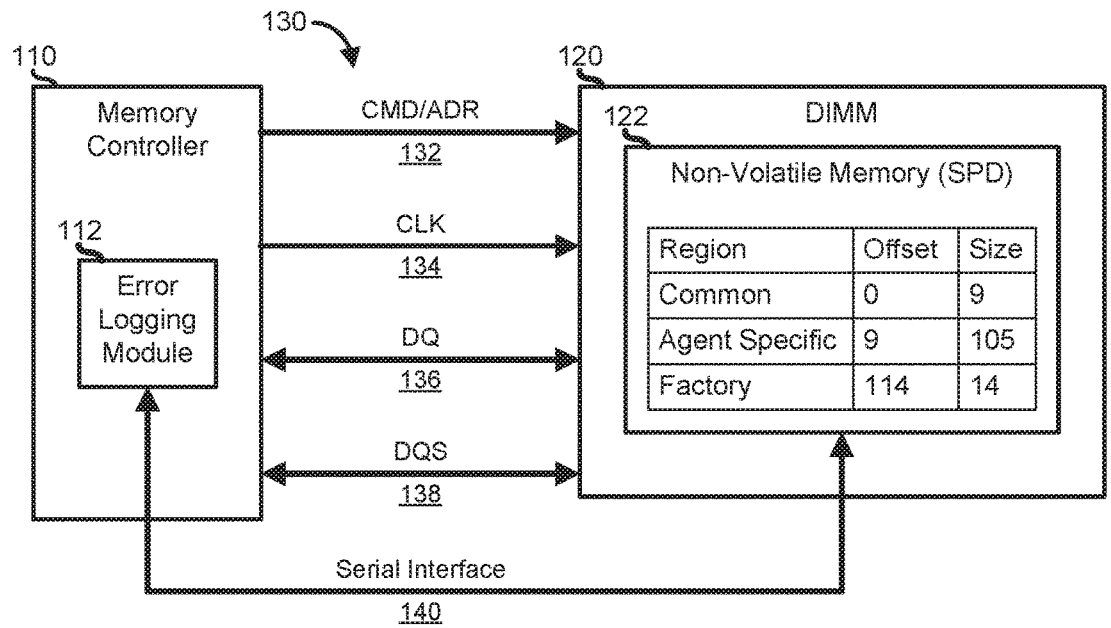
FIG. 1
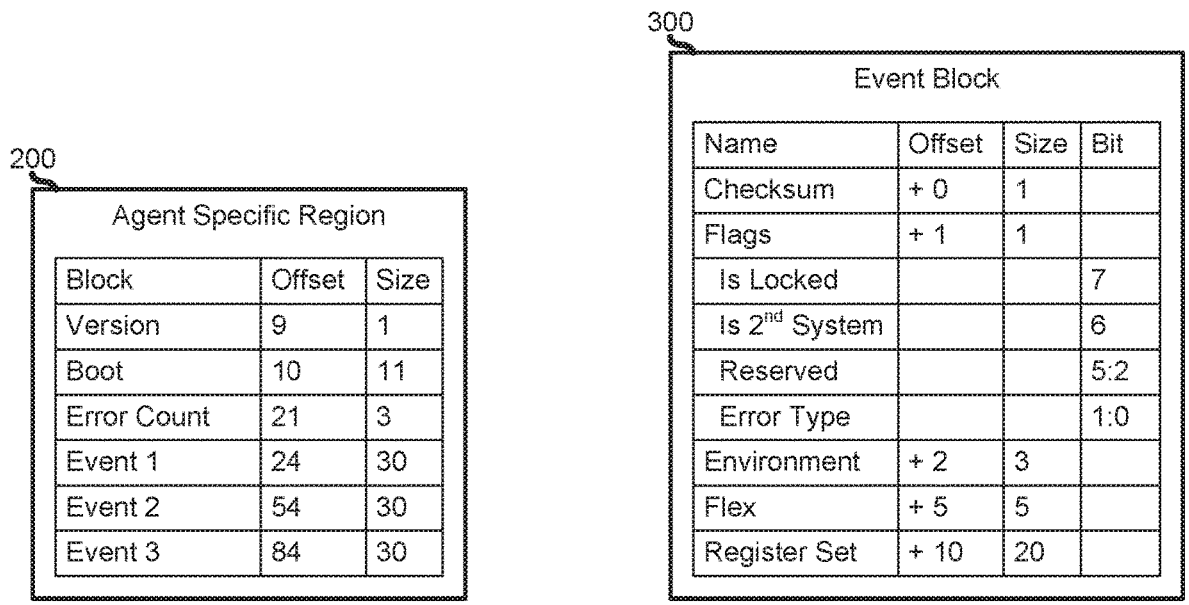
FIG. 2
FIG. 3

| | | Event A | Event B | Event C | Event D | Event E | Final |
|---|---|---|---|---|---|---|---|
| Event Block 1 | Locked | Yes | | | | → | Yes |
| | Correctable | Yes | | | | → | Yes |
| | System A | Yes | | | | → | Yes |
| | Diagnostic Data | A | | | | → | A |
| Event Block 2 | Locked | | No | Yes | | → | Yes |
| | Correctable | | Yes | No | | → | No |
| | System A | | Yes | Yes | | → | Yes |
| | Diagnostic Data | | B | C | | → | C |
| Event Block 3 | Locked | | | | Yes | → | Yes |
| | Correctable | | | | No | → | No |
| | System A | | | | No | → | No |
| | Diagnostic Data | | | | D | → | D |
| Event Block 4 | Locked | | | | | No | No |
| | Correctable | | | | | Yes | Yes |
| | System A | | | | | No | No |
| | Diagnostic Data | | | | | E | E |

*FIG. 4*

SYSTEM AND METHOD FOR TARGETED EFFICIENT LOGGING OF MEMORY FAILURES

FIELD OF THE DISCLOSURE

This disclosure generally relates to information handling systems, and more particularly relates to logging of memory failures in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a memory controller with an error logger, and a DIMM coupled to the memory controller via a memory channel. The DIMM may include a non-volatile memory device mapped to include event blocks that store error information associated with memory events occurring the memory controller, the DIMM, and the memory channel. Each event block may include a flag field and a data field. The error logger may receive an indication that a memory event has occurred, read first flag information from a flag field of an event block, determine whether the event block is locked based upon the first flag information, and if the event block is not locked, then write second flag information to the flag field and write event information to a data field of the event block. The event information may describe the memory event.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which:

FIG. 1 is a block diagram of an information handling system according to an embodiment of the present disclosure;

FIG. 2 is a memory map showing an agent specific region of a non-volatile memory device in a DIMM according to an embodiment of the present disclosure;

FIG. 3 is a memory map showing a typical event block in the agent specific region of FIG. 2;

FIG. 4 illustrates an example of the functions and features of an error logging module in view of an exemplary sequence of error events according to an embodiment of the present disclosure.

The use of the same reference symbols in different drawings indicates similar or identical items.

DETAILED DESCRIPTION OF DRAWINGS

Figure 5:
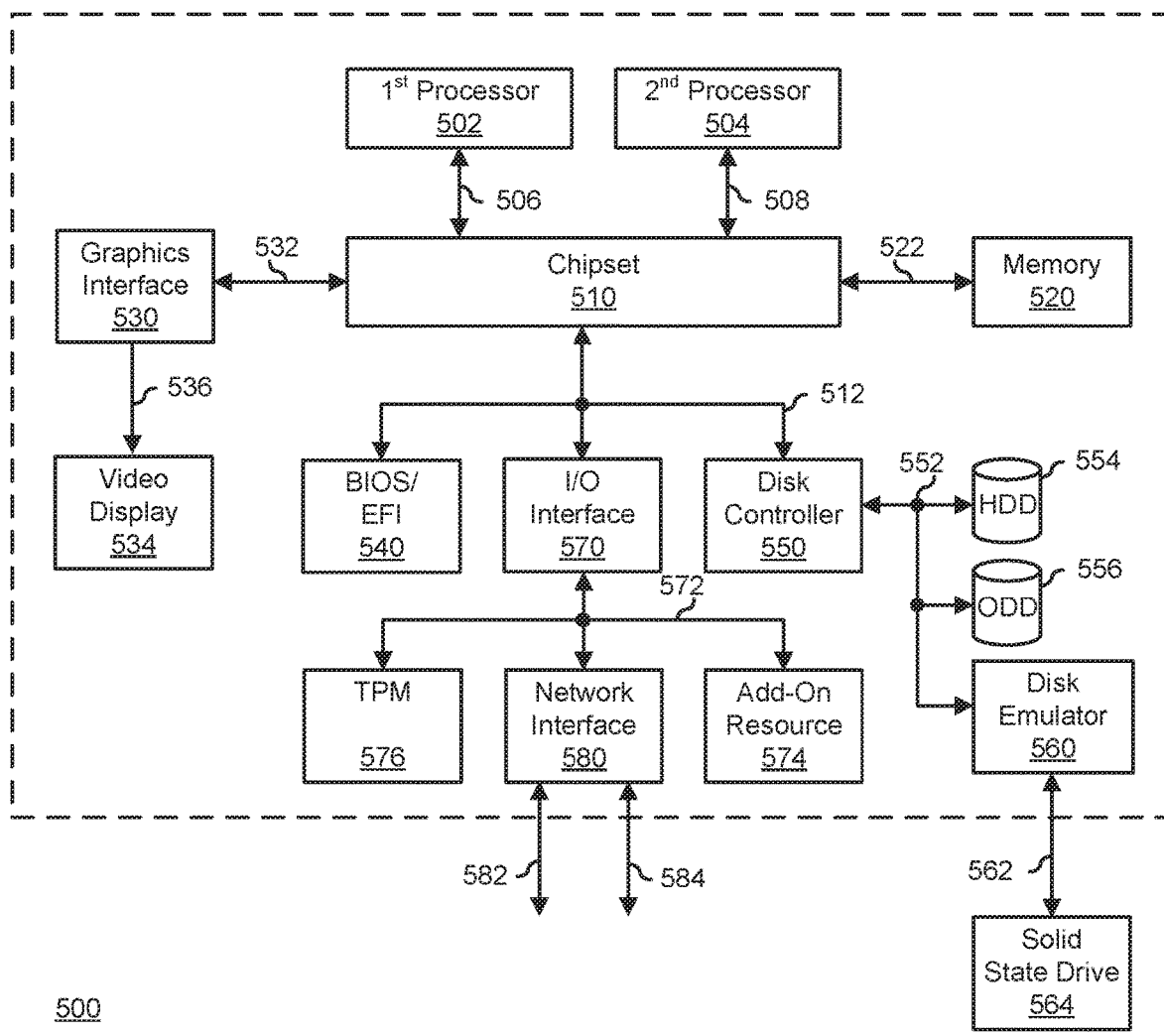
FIG. 5 is a block diagram illustrating a generalized information handling system according to an embodiment of the present disclosure.

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

FIG. 1 illustrates an information handling system 100 including a memory controller 110, and a dual in-line memory module (DIMM) 120. Memory controller 110 and DIMM 120 are coupled together via a memory channel 130. Hereinafter, memory controller 110, DIMM 120, and memory channel 130 may be referred to as the memory subsystem. Memory controller 110 represents a portion of information handling system 100 that operates to manage the flow of information to the main memory of the information handling system, represented by DIMM 120. Memory controller 110 and DIMM 120 operate in accordance with a particular memory architecture implemented on information handling system 100. For example, memory controller 110 and DIMM 120 may operate in accordance with a Double-Data Rate (DDR) standard, such as a JEDEC DDR4 or DDR5 standard. Memory controller 110 includes an error logging module 112, described further below. It will be understood that, where memory controller 110 and DIMM 120 operate in accordance with the DDR5 standard, then the memory controller and DIMM will be configured to provide two separate memory channels similar to memory channel 130. Note that, as illustrated, error logging module 112 is shown as a part of memory controller 110, but this is not necessarily so, and the functions and features of an error logging module as described herein can be performed by other elements of an information handling system, such as by a system BIOS, a baseboard management controller, an error or interrupt handler, or the like.

Memory channel 130 includes a command/address/control bus (CMD/ADR) 132, a clock (CLK) 134 for timing of the signals on the CMD/ADR bus, a data bus (DQ) 136, and a data strobe (DQS) 138 for of the signals on the DQ bus. When information handling system 100 is powered up, for example during a Power-On Self Test (POST) of a system boot process performed by a Basic Input/Output System (BIOS) or Universal Extensible Firmware Interface (UEFI) of the information handling system, the information handling system performs several predefined procedures to ensure that the memory subsystem is configured to provide an optimal level of data transmission reliability and to ensure the highest possible operational bandwidth.

DIMM 120 includes a non-volatile memory 122, such as a Serial Presence Detect read only memory (SPD ROM). DIMM 120 provides an error logging structure for the logging of various error conditions on the DIMM and on information handling system 100 that relate to the performance of the memory subsystem of the information handling system. The error logging structure is stored in non-volatile memory 122 and can be written to and read from to manage the log information in accordance with a particular logging specification associated with the memory technology (e.g., DDR3, DDR4, DDR5, etc.), the processor architecture (e.g., Intel—Skylake, AMD—Rome, etc.), and the manufacturer of information handling system. The error logging structure on non-volatile memory 122 is divided into regions, including a common region, an agent specific region, and a factor region. In the illustrated embodiment, the common region is a nine byte region at offset "0" from the base address of non-volatile memory 122, the agent specific region is a 105 byte region at offset "9," and the factory region is a 14 byte region at offset "114." The common region stores information that is common to all logging agents on information handling system 100, and can include a logging version number, a checksum for the common region, system identification information, and the like. The factory region stores information that is written at the factory that produces DIMM 120. The features and use of common and factory regions of a non-volatile memory on a DIMM are known in the art and will not be further disclosed herein, except as needed to further describe the present embodiments. It will be understood that the organization of the error logging structure are exemplary, and an error logging structure may be organized differently, as needed or desired, without violating the teachings of the present embodiments. Error logging module 112 communicates with non-volatile memory 122 via a low-speed serial interface 140, such as a SPD bus.

The agent specific region stores information that pertains to the agent of information handling system 100 that is writing to the error logging structure. FIG. 2 shows an embodiment of an agent specific region 200 that includes a version block, a boot block, an error count block, and three event blocks. Agent specific regions 200 is divided into blocks including a version block, a boot block, an error count block, and three event blocks. In the illustrated embodiment, the version block is a one byte block at offset "9," the boot block is an 11 byte block at offset "10," the error count block is a three byte block at offset "21," the second event block is a 30 byte block at offset "54," the first event block is a 30 byte block at offset "24," and the third event block is a 30 byte block at offset "84."

The version block includes a version number for the agent specific logging implementation, and can be checked to ensure compatibility of the associated DIMM with the BIOS of the information handling system. The boot block includes information gathered about the DIMM during a system boot process of the information handling system, and may only be modified by an agent that has ownership of access to the non-volatile memory in which the error logging structure is found. For the purposes of this disclosure, ownership is established by the agent that writes the system ID into the common region. In a particular embodiment, ownership may be changed if the DIMM is being moved to or from a customer environment, or if a newer error logging specification or version becomes available and a logging agent overwrites the error logging data with a newer format. The error count region accumulate tallies of memory errors occurring in the DIMM, and can include an uncorrectable error count, a number of times a post-package repair has been performed on the DIMM, a correctable error count, a number of correctable error threshold warnings that have been issued by the DIMM, a number of correctable error critical threshold warnings that have been issued by the DIMM, or the like.

The event blocks each provide information about the system state of the information handling system when a particular error occurred. FIG. 3 shows an embodiment of an event block 300 that includes a checksum field, a flags field, an environment field, a flex field, and a register set field. Because an agent specific field includes more than one event block, the addresses shown in event block 300 are shown as offsets in addition to a base address for the particular event block. The checksum field is a one byte field at offset "Base+0," the flags field is a one byte field at "Base+1," the environment field is a three bit field at "Base+2," the flex field is a five bit field at "Base+5," and the register set field is a 20 bit field at "Base+20." The checksum field provides a checksum for the contents of event block 300.

The environment block includes information related to the processing environment of the information handling system, and may include an indication as to whether or not a leaky-bucket algorithm was enabled for tracking and reporting memory errors when the event was recorded, a processor socket number for the processor of the information handling system that observed the error, BIOS version operating on the information handling system when the event was recorded, and the like. The flex field includes different information when the reporting agent has ownership of the non-volatile memory than when the reporting agent is not the owner.

When the reporting agent is also the owner of the non-volatile memory, the flex field includes a number of DIMMs that are on the memory channel with the DIMM, temperature information for the DIMM that reported the error, memory data rate information, event date information, and the like. When the reporting agent is not the owner of the non-volatile memory, the flex field includes system identifying information associated with the event, and the like. The registers set field includes system- and scenario-specific register information associated with the event, and may be conditioned upon information stored in the flag field, as described below. The register set field may also be conditioned upon the processor architecture associated with the information handling system. The details of error event logging, and particularly the contents of a register set field of an event block, are known in the art and beyond the scope of the current disclosure, and will not be further disclosed except as needed to illustrate the present embodiments.

The flags field includes a bit to indicate that event block 300 is locked (IS_LOCKED) from being overwritten at bit 7, a bit to indicate whether the system that wrote the event block is the system with ownership over the non-volatile memory (IS_SECONDARY_SYSTEM) at bit 6, and an error type field to indicate the nature of the error associated with the event block at bits 1:0. In particular, the error type field identifies whether the error was a correctable error or an uncorrectable error, and, if the error was a correctable error, whether the error resulted in a leaky bucket warning threshold alert, a leaky bucket critical threshold alert, or a individual correction when the leaky bucket algorithm is not enabled (as noted in the environment field, as described above).

As server configurations become more dense and operate with increasing speeds, manufacturers of information handling systems may see much higher rates of correctable and uncorrectable error checking and correcting (ECC) errors within the memory subsystems. However, ECC errors can be highly situation- and configuration-specific, so knowing the environment of a particular failing DIMM at time of failure and the failure mode itself is critical for the manufacturer's failure analysis. However, when DIMMs are returned and analyzed from a field environment, it can be difficult to acquire precise situation and configuration information. In particular, even where a memory subsystem provides error logging, such as by writing event blocks in a non-volatile memory of a DIMM, as described above, such error logs can be transient in nature. In particular, where the size of a non-volatile memory on a DIMM is small, the number of logged events may not be sufficient to adequately understand the underlying issues.

Returning to FIG. 1, error logging module 112 operates to receive indications of memory errors from DIMM 120 and other DIMMs on memory channel 130, to determine whether or not to log the memory errors to one or more event block on the DIMMs, and, if it is decided to log the memory errors, to write the error log information, as described above, to a selected event block in the non-volatile memory of the selected DIMM. In determining whether or not to log a memory error to an event block, a typical error logging module will read a first event block to determine whether or not the first event block is empty, or if the event block already includes error information to determine whether or not to overwrite the error information in the first event block. If the typical error logging module determines that the first event block should not be overwritten, the process of determining where to write the error information for the current memory error is repeated with a second event block. It will be understood that the non-volatile memory of a DIMM is typically accessed via a low-speed serial interface such as a Serial Presence Interface on the information handling system. Thus the repeated accessing of the non-volatile memory of a DIMM to access one or more event block winds up utilizing a large portion of the bandwidth of the low-speed serial interface.

Here, when error logging module 112 logs an event to an event block in a non-volatile memory of a DIMM, the error logging module also determines whether or not that event block is locked by setting the IS_LOCKED bit of the flag field of the event block with the appropriate value. The specifics of how error logging module 112 determines whether or not a particular event block should be locked will be described further below. However, because an event block in the present embodiment includes the IS_LOCKED bit in the flag field of the event block, error logging module 112 determines whether or not to write error information to a particular event block based upon the contents of the IS_LOCKED bit of the flag field of the particular event block.

Here, error logging module 112 will read the flag field of the first event block and determine whether or not the IS_LOCKED bit is set. If not, then error logging module 112 logs the memory error information to the first event block. On the other hand, if the IS_LOCKED bit of the first event block is set, then error logging module 112 reads the flag field from the next event block and repeats the determination. Here, the amount of data transmitted over serial interface 140 is greatly reduced over having to read an entire event block with the typical error logging module, as described above.

In a particular embodiment, error logging module 112 operates to define particular events as being of interest in terms of the utility in failure analysis. Such events of interest are logged to an event block of non-volatile memory 122 by error logging module 112. Here, error logging module 112 operates to detect whether or not the error associated with a particular event is of interest, and if so, the error logging module operates to set the IS_LOCKED bit for that event in the flags field of the event block. Here, some interesting events can be defined based upon conditions that are represented in one or more of the fields of the event block, such as fields within the flags field, the environment field, the flex field, or the register set field for the event block. For example, a first instance of an uncorrectable error can be logged, a correctable error that results in a leaky-bucket algorithm reaching a waring or critical threshold can be logged, or other events can be logged.

Other events can be defined based upon conditions that are represented in one or more fields from a previously stored event block, such as fields within the flags field, the environment field, the flex field, or the register set field for the event block, and in particular such events can be defined based upon the prior conditions as compared with the current conditions for an event. In a preferred embodiment, the events of interest are all represented by fields within the flags field of the event blocks, such that, where previous events are needed to determine if an event is of interest, the comparison can be made by reading the flags fields of the previous events and comparing the contents with the conditions of the current event. An example of an event of interest can include a first reported error on a particular DIMM, the occurrence of errors on multiple systems, errors that represent a transition from correctable errors to uncorrectable errors (that is, the first uncorrectable error after one or more previous correctable errors), errors that represent a transition from uncorrectable errors to correctable errors (that is, the first correctable error after one or more previous uncorrectable errors), and the like.

Error logging module 112 further operates to implement a set of locking rules that define how and when a particular event block is locked, by setting the IS_LOCKED bit in the flags field. For example, error logging module 112 can operate to lock a first event block for any type of event, because a first instance of a memory error can include particularly interesting information in terms of a manufacturer's failure analysis. Further, error logging module 112 can operate to leave a last event block unlocked, by clearing the IS_LOCKED bit in the flags field. Here it can be advantageous for the manufacturer's failure analysis effort to know the conditions related to the last logged error. For event blocks that are stored between the first and last event block (e.g., the second event block as described in FIG. 2), the event blocks can be locked when the first block represented a correctable error and the current error is an uncorrectable error, when the first block represented an uncorrectable error and the current error is a correctable error, or when the current error is generated from a different device ID or system than the device ID or system that generated the previous event block.

FIG. 4 illustrates an example of the functions and features of an error logging module in view of an exemplary sequence of error events. Note that the exemplary system implements four event blocks. It will be understood that an error logging scheme may implement a greater or a lesser number of event blocks, as needed or desired. When a first memory error is detected (Event A), the error logging module reads the flags field of a first event block (Event Block 1) and determines that the IS_LOCKED bit is not set. The error logging module determines that the error type is a correctable error and that the error occurred on the primary system, and so the error logging module formats data to write to Event Block 1. The data includes a flags field with the IS_LOCKED bit set (because this is the first error detected), the IS_SECONDARY_SYSTEM bit cleared (because the error occurred on the primary system), and the type field set to indicate that the error was a correctable error. The data further includes diagnostic data (A) in an environment field, a flex field, and a register set field of Event Block 1.

When a second memory error is detected (Event B), the error logging module reads the flags field of Event Block 1 and determines that the IS_LOCKED bit is set, and so the error logging module reads the flags field of a second event block (Event Block 2) and determines that the IS_LOCKED bit is not set. The error logging module determines that the error type is a correctable error and that the error occurred on the primary system, and so the error logging module formats data to write to Event Block 2. The data includes a flags field with the IS_LOCKED bit cleared (because this is similar to Event A), the IS_SECONDARY_SYSTEM bit cleared, and the type field set to indicate that the error was a correctable error. The data further includes diagnostic data (B) in an environment field, a flex field, and a register set field of Event Block 2.

Subsequent error events that represent correctable errors that occur on the primary system may overwrite Event Block 2, thereby retaining the information related to the latest error in Event Block 2. However, when an error is detected with different conditions, such as when a third memory error is detected (Event C), and the error logging module determines that the error occurred on the primary system, but the error is an uncorrectable error, then the error logging module formats new data to write to Event Block 2. The data includes a flags field with the IS_LOCKED bit set (because this error represents a transition from correctable errors to uncorrectable errors), the IS_SECONDARY_SYSTEM bit cleared, and the type field set to indicate that the error was an uncorrectable error. The data further includes diagnostic data (C) in the environment field, the flex field, and the register set field of Event Block 2.

When a fourth memory error is detected (Event D), the error logging module reads the flags field of Event Blocks 1 and 2 and determines that the IS_LOCKED bits are both set, and so the error logging module reads the flags field of a third event block (Event Block 3) and determines that the IS_LOCKED bit is not set. The error logging module determines that the error type is an uncorrectable error and that the error occurred on a secondary system, and so the error logging module formats data to write to Event Block 3. The data includes a flags field with the IS_LOCKED bit set (because this error represents a transition from the primary system to a secondary system), the IS_SECONDARY_SYSTEM bit set, and the type field set to indicate that the error was an uncorrectable error. The data further includes diagnostic data (D) in an environment field, a flex field, and a register set field of Event Block 3.

When a fifth memory error is detected (Event E), the error logging module reads the flags field of Event Blocks 1, 2, and 3 and determines that all of the IS_LOCKED bits are set, and so the error logging module reads the flags field of a fourth event block (Event Block 4) and determines that the IS_LOCKED bit is not set. The error logging module determines that the error type is a correctable error and that the error occurred on the secondary system, and so the error logging module formats data to write to Event Block 4. The data includes a flags field with the IS_LOCKED bit cleared, the IS_SECONDARY_SYSTEM bit set, and the type field set to indicate that the error was a correctable error. Here, even though the error represents a transition back from uncorrectable errors to correctable errors, the IS_LOCKED bit is cleared because Event Block 4 is the last event block, and so all subsequent error events will be logged in Event Block 4 so that the error log always includes information for the last received error. The data further includes diagnostic data (E) in an environment field, a flex field, and a register set field of Event Block 4.

FIG. 4 illustrates a generalized embodiment of information handling system 400. For purpose of this disclosure information handling system 400 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described above, and operates to perform one or more of the methods described above. Information handling system 400 includes a processors 402 and 404, a chipset 410, a memory 420, a graphics interface 430, include a basic input and output system/extensible firmware interface (BIOS/EFI) module 440, a disk controller 450, a disk emulator 460, an input/output (I/O) interface 470, and a network interface 480. Processor 402 is connected to chipset 410 via processor interface 406, and processor 404 is connected to the chipset via processor interface 408. Memory 420 is connected to chipset 410 via a memory bus 422. Graphics interface 430 is connected to chipset 410 via a graphics interface 432, and provides a video display output 436 to a video display 434. In a particular embodiment, information handling system 400 includes separate memories that are dedicated to each of processors 402 and 404 via separate memory interfaces. An example of memory 420 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 440, disk controller 450, and I/O interface 470 are connected to chipset 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 410 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/EFI module 440 includes BIOS/EFI code operable to detect resources within information handling system 400, to provide drivers for the resources, initialize the resources, and access the resources. BIOS/EFI module 440 includes code that operates to detect resources within information handling system 400, to provide drivers for the resources, to initialize the resources, and to access the resources.

Disk controller 450 includes a disk interface 452 that connects the disc controller to a hard disk drive (HDD) 454, to an optical disk drive (ODD) 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits a solid-state drive 464 to be connected to information handling system 400 via an external interface 462. An example of external interface 462 includes a USB interface, an IEEE 1394 (Firewire) interface, a proprietary interface, or a combination thereof. Alternatively, solid-state drive 464 can be disposed within information handling system 400.

I/O interface 470 includes a peripheral interface 472 that connects the I/O interface to an add-on resource 474, to a TPM 476, and to network interface 480. Peripheral interface 472 can be the same type of interface as I/O channel 412, or can be a different type of interface. As such, I/O interface 470 extends the capacity of I/O channel 412 when peripheral interface 472 and the I/O channel are of the same type, and the I/O interface translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as chipset 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
a memory controller including an error logger; and
a dual in-line memory module (DIMM) coupled to the memory controller via a memory channel, the DIMM including a non-volatile memory device mapped to include a plurality of event blocks, each event block to store error information associated with memory event occurring on one or more of the memory controller, the DIMM, and the memory channel, each event block including a flag field and a data field;
wherein the error logger is configured to:
receive a first indication that a first memory event has occurred;
read first flag information from a first flag field of a first event block;
determine whether the first event block is locked based upon the first flag information; and
if the first event block is not locked, then write second flag information to the first flag field and write event information to a first data field of the first event block, the event information to describe the first memory event.

2. The information handling system of claim 1, wherein if the first event is not locked, the error logger is further configured to:
  determine if the first memory event satisfies a condition based upon the first flag information, wherein if the first memory event satisfies the condition, the first flag information includes an indication that the first event block is locked.

3. The information handling system of claim 2, wherein in determining if the first memory event satisfies the condition, the error logger is further configured to:
  determine that a second memory event that occurred prior to the first memory event represented a correctable memory error based upon the first flag information and that the first memory event represents an uncorrectable memory error.

4. The information handling system of claim 2, wherein in determining if the first memory event satisfies the condition, the error logger is further configured to:
  determine that a second memory event that occurred prior to the first memory event represented an uncorrectable memory error based upon the first flag information and that the first memory event represents a correctable memory error.

5. The information handling system of claim 2, wherein in determining if the first memory event satisfies the condition, the error logger is further configured to:
  determine that a second memory event that occurred prior to the first memory event was generated by a first element of the information handling system based upon the first flag information and that the first memory event is generated by a second element of the information handling system.

6. The information handling system of claim 2, wherein if the first memory event does not satisfy the condition, the error logger is further configured to:
  determine if the first event block is a last event block on the non-volatile memory device, wherein if the first event block is the last event block, the first flag information includes an indication that the first event block is unlocked.

7. The information handling system of claim 1, wherein if the first event block is locked, the error logger is further configured to:
  read a second flag field of a second event block;
  determine whether or not the second event block is locked based upon the second flag field; and
  if the second event block is not locked, write the first flag information to the second flag field and the event information to a second data field of the second event block.

8. A method for logging memory errors, the method comprising:
  receiving, by an error logger of a memory controller of an information handling system, a first indication that a first memory event has occurred on one or more of the memory controller, a dual in-line memory module of the information handling system, and a memory channel that couples the memory controller to the DIMM;
  reading, by the error logger, first flag information from a first flag field of a first event block of a non-volatile memory device of the DIMM, wherein the non-volatile memory device is mapped to include a plurality of event blocks, each event block storing error information associated with memory events occurring on one or more of the memory controller, the DIMM, and the memory channel, and each event block including a flag field and a data field;
  determining, by the error logger, whether the first event block is locked based upon the first flag information; and
  if the first event block is not locked, then writing, by the error logger, second flag information to the first flag field and write event information to a first data field of the first event block, the event information to describe the first memory event.

9. The method of claim 8, wherein if the first event is not locked, the method further comprises:
  determining, by the error logger, if the first memory event satisfies a condition based upon the first flag information, wherein if the first memory event satisfies the condition, the first flag information includes an indication that the first event block is locked.

10. The method of claim 9, wherein in determining if the first memory event satisfies the condition, the method further comprises:
  determining, by the error logger, that a second memory event that occurred prior to the first memory event represented a correctable memory error based upon the first flag information and that the first memory event represents an uncorrectable memory error.

11. The method of claim 9, wherein in determining if the first memory event satisfies the condition, the method further comprises:
  determining, by the error logger, that a second memory event that occurred prior to the first memory event represented an uncorrectable memory error based upon the first flag information and that the first memory event represents a correctable memory error.

12. The method of claim 9, wherein in determining if the first memory event satisfies the condition, the method further comprises:
  determining, by the error logger, that a second memory event that occurred prior to the first memory event was generated by a first element of the information handling system based upon the first flag information and that the first memory event is generated by a second element of the information handling system.

13. The method of claim 9, wherein if the first memory event does not satisfy the condition, the method further comprises:
  determining, by the error logger, if the first event block is a last event block on the non-volatile memory device, wherein if the first event block is the last event block, the first flag information includes an indication that the first event block is unlocked.

14. The method of claim 8, wherein if the first event block is locked, the method further comprises:
  reading, by the error logger, a second flag field of a second event block;
  determining, by the error logger, whether or not the second event block is locked based upon the second flag field; and
  if the second event block is not locked, writing, by the error logger, the first flag information to the second flag field and the event information to a second data field of the second event block.

15. An information handling system, comprising:
  a memory controller including an error logger; and
  a double data rate 5 (DDR5) dual in-line memory module (DIMM) coupled to the memory controller via a memory channel, the DDR5 DIMM including a non-volatile memory device mapped to include a plurality of event blocks, each event block to store error information associated with memory event occurring on one or more of the memory controller, the DIMM, and the memory channel, each event block including a flag field and a data field;

wherein the error logger is configured to:
receive a first indication that a first memory event has occurred;
read first flag information from a first flag field of a first event block;
determine whether the first event block is locked based upon the first flag information; and
if the first event block is not locked, then write second flag information to the first flag field and write event information to a first data field of the first event block, the event information to describe the first memory event.

16. The information handling system of claim 15, wherein if the first event is not locked, the error logger is further configured to:
determine if the first memory event satisfies a condition based upon the first flag information, wherein if the first memory event satisfies the condition, the first flag information includes an indication that the first event block is locked.

17. The information handling system of claim 16, wherein in determining if the first memory event satisfies the condition, the error logger is further configured to:
determine that a second memory event that occurred prior to the first memory event represented a correctable memory error based upon the first flag information and that the first memory event represents an uncorrectable memory error.

18. The information handling system of claim 16, wherein in determining if the first memory event satisfies the condition, the error logger is further configured to:
determine that a second memory event that occurred prior to the first memory event represented an uncorrectable memory error based upon the first flag information and that the first memory event represents a correctable memory error.

19. The information handling system of claim 16, wherein in determining if the first memory event satisfies the condition, the error logger is further configured to:
determine that a second memory event that occurred prior to the first memory event was generated by a first element of the information handling system based upon the first flag information and that the first memory event is generated by a second element of the information handling system.

20. The information handling system of claim 16, wherein if the first memory event does not satisfy the condition, the error logger is further configured to:
determine if the first event block is a last event block on the non-volatile memory device, wherein if the first event block is the last event block, the first flag information includes an indication that the first event block is unlocked.

* * * * *